United States Patent
Jung

(10) Patent No.: US 10,844,528 B2
(45) Date of Patent: Nov. 24, 2020

(54) ANTI-WEED SHEET

(71) Applicant: Sung Mo Jung, Yeosu-si (KR)

(72) Inventor: Sung Mo Jung, Yeosu-si (KR)

( * ) Notice: Subject to any disclaimer, the term of this patent is extended or adjusted under 35 U.S.C. 154(b) by 117 days.

(21) Appl. No.: 16/091,180

(22) PCT Filed: Apr. 7, 2017

(86) PCT No.: PCT/KR2017/003797
§ 371 (c)(1),
(2) Date: Oct. 4, 2018

(87) PCT Pub. No.: WO2017/176079
PCT Pub. Date: Oct. 12, 2017

(65) Prior Publication Data
US 2019/0161896 A1    May 30, 2019

(30) Foreign Application Priority Data

Apr. 7, 2016  (KR) .................. 10-2016-0042636

(51) Int. Cl.
*D04H 1/498*  (2012.01)
*A01G 13/02*  (2006.01)
(Continued)

(52) U.S. Cl.
CPC ............. *D04H 1/498* (2013.01); *A01G 13/02* (2013.01); *A01G 13/0268* (2013.01);
(Continued)

(58) Field of Classification Search
CPC ...... D04H 1/4291; D04H 1/498; A01G 13/02; A01C 1/04
See application file for complete search history.

(56) References Cited

U.S. PATENT DOCUMENTS 5,397,368 A * 3/1995 Molnar .................. A01G 20/20
47/1.01 F
5,908,792 A * 6/1999 Sheehan ............... F16D 69/023
428/36.2
(Continued)

FOREIGN PATENT DOCUMENTS

JP    2010-150737 A    7/2010
KR    10-0779925 B1    11/2007
(Continued)

OTHER PUBLICATIONS

International Search Report for PCT/KR2017/003797 dated Aug. 8, 2017 from Korean Intellectual Property Office.

*Primary Examiner* — Scott W Dodds
(74) *Attorney, Agent, or Firm* — Paratus Law Group, PLLC

(57) ABSTRACT

Disclosed is an anti-weed sheet manufactured by forming webs. The web is formed of polyolefin-based staple fibers which are at least one selected from the group consisting of polyethylene staple fibers, polypropylene staple fibers, and polyisobutylene staple fibers. The sheet is bonded integrally by the needle punching by forming the webs, and the needle punching is performed in the order of pre-needle punching, low-speed needle punching, high-speed needle punching and low-speed needle punching to uniformly bridging the surface and the inside of the formed webs and improve a binding force. At least one surface of the sheet is modified by heat treatment through hot air or a heating drum.

5 Claims, 1 Drawing Sheet

(51) Int. Cl.
  *B32B 5/02*    (2006.01)
  *B32B 5/06*    (2006.01)
  *B32B 5/08*    (2006.01)
  *B32B 5/12*    (2006.01)
  *B32B 5/26*    (2006.01)
  *D04H 1/4291*  (2012.01)
  *D04H 1/485*   (2012.01)

(52) U.S. Cl.
  CPC ............... *B32B 5/022* (2013.01); *B32B 5/06* (2013.01); *B32B 5/08* (2013.01); *B32B 5/12* (2013.01); *B32B 5/26* (2013.01); *D04H 1/4291* (2013.01); *D04H 1/485* (2013.01); *B32B 2250/20* (2013.01); *B32B 2262/0253* (2013.01); *B32B 2307/724* (2013.01); *B32B 2307/726* (2013.01); *B32B 2410/00* (2013.01); *D10B 2321/022* (2013.01); *D10B 2505/18* (2013.01)

(56) References Cited

U.S. PATENT DOCUMENTS

2004/0231238 A1* 11/2004 Baggio .................. A01C 1/044
                                                        47/56
2014/0066872 A1*  3/2014 Baer ....................... B32B 27/32
                                                       604/367

FOREIGN PATENT DOCUMENTS

| KR | 10-2010-0093334 A | 8/2010 |
| KR | 10-2012-0107843 A | 10/2012 |
| KR | 10-1602156 B1 | 3/2016 |
| KR | 10-1640764 B1 | 7/2016 |

\* cited by examiner

ANTI-WEED SHEET

CROSS REFERENCE TO PRIOR APPLICATIONS

This application is a National Stage patent application of PCT International Patent Application No. PCT/KR2017/003797 (filed on Apr. 7, 2017) under 35 U.S.C. § 371, which claims priority to Korean Patent Application No. KR 10-2016-0042636 (filed on Apr. 7, 2016), which are all hereby incorporated by reference in their entirety.

BACKGROUND

The present invention relates to an anti-weed sheet manufactured by forming webs and more particularly, to an anti-weed sheet in which a sheet is formed by forming webs formed of a polyolefin-based staple fiber and integrally combining the webs through needle punching and at least one surface of the sheet is modified by thermal treatment, thereby suppressing the growth of weeds.

Conventional anti-weed film materials have been mainly used to suppress the growth of weeds growing in soils where crops are planted. Such a film material has an effect of easily removing weeds with a low labor force in suppressing the growth of weeds. However, since the film material has insufficient permeability and drainability, it is inconvenient to peel the film when water is added to the crops, oxygen supply to the soil is interrupted due to the film to suppress the cultivation of microorganisms so that the growth of the crops is slowed down due to the acidification of the soil, and it is difficult to reuse the film due to deformation of the film by ultraviolet rays and a secondary contamination problem occurs due to the discarded film in the soils.

On the other hand, in the current peninsula, the southern coast is a wet sub-tropical climate (high temperature and humidity in summer) and other areas are a continental climate zone, and with continued warming, most areas of South Korea except the mountains are expected to be changed into a subtropical climate. As a result, due to the activity of weed growth, heavy rainfall and high temperature and high humidity, roads such as highways, national roads, and provincial roads, sidewalk blocks and roadside shoulder surroundings cause many problems, such as environmental damage and traffic accidents caused by weeds, ground subsidence, road loss of construction and civil engineering sites, and the like.

Accordingly, various shapes have been attempted to solve such conventional problems. For example, Korean Patent Application No. 10-2006-0106979 discloses an anti-weed mat comprising a hygroscopic layer which is made of fire-retardant crushed waste fabrics having a good hygroscopic property; a pored fabric layer which prevents the evaporation of water from the hygroscopic layer and is formed with pores; and a surface layer which is bonded on the pored fabric layer, has a top face heat-treated to be smooth, and is made by mixing 50 to 80 wt % of polyethylene terephthalate, 10 to 30 wt % of polypropylene, and 10 to 20 wt % of polyethylene to suppress the growth of weeds due to no hygroscopic property, and has a heat-treated upper surface, in which each layer is bonded by punching with a needle punching machine.

However, the anti-weed mat, in which at least three or more materials such as the hygroscopic layer, the pored fabric layer, and the heat-treated sheet are combined with a needle punch, has a problem in that the productivity is greatly reduced, the production cost is considerably high, and the air permeability and water permeability are poor to cause the degradation of soils.

In Korean Patent Application No. 10-2009-0012472, there is proposed an anti-weed needle punching nonwoven fabric in which polyester staple fibers are bonded by needle punching to form a nonwoven fabric, wherein a polyester staple fiber of 6 to 10 denier of 25 to 50 wt %, a polyester staple fiber of 10 to 20 denier of 10 to 30 wt %, a polyester staple fiber of 10 to 15 denier of the rest amount are combined and bonded by needle punching.

However, in the anti-weed needle punching nonwoven fabric in which three or more kinds of polyester staple fibers are mixed and bonded by needle punching, a drying process is necessarily required in a manufacturing process of the nonwoven fabric due to a hygroscopic phenomenon of a polyester resin used as the material of the staple fibers, and the hydrolysis is promoted due to the weak water resistance of the polyester resin, resulting in poor durability.

On the other hand, Korean Patent Application No. 10-2011-7030896 discloses a nonwoven fabric having an uneven surface structure in which hot air passes through a web including thermally adhesive fibers to press a planar body having a plurality of openings on at least one surface of a nonwoven fabric having heat-bonded bridging points between the fibers, wherein the pressing treatment is performed in a state in which the nonwoven fabric has heat at which the thermal bonding of the nonwoven fabric is not performed.

However, the nonwoven fabric having the uneven surface structure is proposed to be used for sanitary materials such as disposable diapers or wiping cloths, and has a problem in that tensile strength, elongation, durability and the like are deteriorated in order to be used for anti-weed.

SUMMARY

The present invention has been made to solve the above-mentioned problems and an object of the present invention is to provide an anti-weed sheet capable of improving weed growth inhibition by improving tensile strength, elongation, rupture strength, light resistance, salt water resistance, water permeability, air permeability and durability, preventing soil loss, acidification, and soil contamination, and maintaining the restoring force of the soil.

Another object of the present invention is to provide an anti-weed sheet capable of simplifying a manufacturing process and reducing manufacturing cost by using polyolefin-based staple fibers.

According to an aspect of the present invention, there is provided an anti-weed sheet manufactured by forming webs, in which the web is formed of polyolefin-based staple fibers which are at least one selected from the group consisting of polyethylene staple fibers, polypropylene staple fibers, and polyisobutylene staple fibers, the sheet is bonded integrally by the needle punching by forming the webs, and at least one surface of the sheet is modified by heat treatment through hot air or a heating drum.

The web may be formed of staple fibers having a fineness of 2 denier or more to 15 denier or less.

The web may be formed by mixing 20 to 80 wt % of low denier staple fibers having a fineness of 2 denier or more to less than 7 denier and 20 to 80 wt % of high denier staple fibers having 7 denier or more to 15 denier or less.

The weight of the web may be 5 to 50 g/m2.

The webs may be alternately formed based on a machine direction of the sheet to be integrally bonded with the sheet.

According to the anti-weed sheet of the present invention, it is possible to improve weed growth inhibition by improving tensile strength, elongation, rupture strength, light resistance, salt water resistance, water permeability, air permeability and durability, prevent soil loss, acidification, and soil contamination, and maintain the restoring force of the soil.

Further, it is possible to simplify a manufacturing process and reduce manufacturing cost by using polyolefin-based staple fibers.

DETAILED DESCRIPTION

Figure 1:
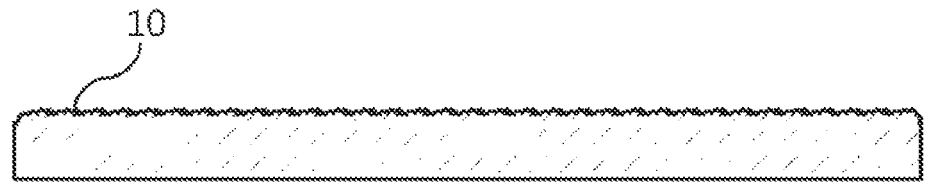
FIG. 1 is a cross-sectional view of an anti-weed sheet according to an exemplary embodiment of the present invention.

Hereinafter, exemplary embodiments of the present invention will be described in detail with reference to the accompanying drawings.

When reference numerals refer to components of each drawing, it is to be noted that although the same components are illustrated in different drawings, the same components are denoted by the same reference numerals as possible. Further, in describing the present invention, a detailed explanation of known related configurations and functions may be omitted to avoid unnecessarily obscuring the subject matter of the present invention.

In describing the components of the present invention, terms including first, second, A, B, (a), (b), and the like may be used. These terms are just intended to distinguish the components from other components, and the terms do not limit the nature, sequence, or order of the components. When it is disclosed that any component is "connected", "coupled", or "linked" to other components, it should be understood that the component may be directly connected or linked to other components, but another component may be "connected", "coupled", or "linked" between the respective components.

Further, when it is described that a component such as a layer, a film, a region, or a plate is located "above" or "on" another component, it means that the component may be located "directly above" on the another component and a third component may be interposed therebetween as well. On the contrary, it should be appreciated that when a certain component is "directly above" another component, a third component is not interposed therebetween.

An anti-weed sheet according to an exemplary embodiment of the present invention is characterized in that a sheet is formed by forming webs formed of a polyolefin-based staple fiber and integrally combining the webs through needle punching and at least one surface of the sheet is modified by thermal treatment.

The anti-weed sheet is to suppress the growth of weeds and suppress soil acidification, soil loss, ground subsidence, and the like which are secondary problems caused due to weeds in agricultural land, roads such as highways, national roads, and provincial roads, sidewalk blocks and roadside shoulder surroundings.

The needle punching is performed by repeated up and down motions using needles on the surface or back surface of the web or the staple fiber layer through a needle punching machine so that the web or staple fibers are mechanically tangled to form a nonwoven fabric having a uniform thickness and fiber density.

Hereinafter, an anti-weed sheet according to an exemplary embodiment of the present invention will be described in more detail.

FIG. 1 is a cross-sectional view of an anti-weed sheet according to an exemplary embodiment of the present invention.

The sheet may be a woven fabric or a nonwoven fabric, but the anti-weed sheet according to the present invention is preferably a nonwoven fabric. It is preferable that the nonwoven fabric is manufactured by needle punching by forming webs formed of polyolefin-based staple fibers.

The polyolefin-based resin used for the staple fiber is hydrophobic and hardly absorbs moisture, and even if the polyolefin-based resin is installed on or below the ground surface, hydrolysis does not occur and thus durability is excellent, and there is no hygroscopic phenomenon and thus a separate drying process is not required in the manufacturing process. On the other hand, polyester resin which is widely used for general purpose is poor in durability due to promotion of hydrolysis due to moisture, and a drying process in manufacturing process is necessarily required due to a moisture absorption phenomenon. In addition, the properties of the fiber itself such as the fineness, strength and modulus of the fiber may be adjusted by controlling the stretching ratio in the fiber spinning, and the polyolefin-based resin has a wider adjustment range of the stretching ratio than a polyester resin to manufacture staple fibers having various properties. The polyolefin-based staple fibers include polyethylene staple fibers, polypropylene staple fibers, and polyisobutylene staple fibers, but are not limited thereto, and the polyolefin-based staple fibers may be used alone or in combination of two or more kinds when forming webs.

The web used in the anti-weed sheet according to the present invention may be formed by mixing polyolefin-based staple fibers having the same or different fineness.

That is, as the polyolefin-based staple fibers having different finenesses are distributed and bound in various ways in the web, the size and shape of the space formed between the respective staple fibers are variously formed and the various types of spaces may allow the air in the atmosphere to easily penetrate into the soil through the sheet. As the surface is roughly formed due to a difference in binding degree of the staple fibers, the moisture is easily absorbed from the surface of the sheet so that the polyolefin-based staple fibers have a good water permeability effect, the anti-weed sheet has a high tensile strength and a low elongation due to staple fibers formed by being tangled to each other by needle punching so that the anti-weed sheet has excellent durability, and the penetration of sunlight is suppressed by the staple fibers so that the anti-weed sheet has an excellent anti-weed effect.

The web used in the present invention may be formed of staple fibers having a fineness of 2 denier or more and 15 denier or less.

If the fineness of the staple fibers is less than 2 denier, the space between the fibers becomes denser in the web constituting the sheet so that the anti-weed effect is improved, but water permeability and air permeability may be deteriorated. If the fineness of the staple fibers is more than 15 denier, the space between the fibers becomes wider in the web constituting the sheet so that the water permeability and air permeability may be improved, but the anti-weed effect may be deteriorated.

The web used in the present invention may be constituted by combining 20 to 80 wt % of low denier staple fibers having a fineness of 2 denier or more to less than 7 denier and 20 to 80 wt % of high denier staple fibers having 7 denier or more to 15 denier or less, preferably, 30 to 70 wt % of low denier staple fibers having a fineness of 2 denier or more to less than 7 denier and 30 to 70 wt % of high denier staple fibers having 7 denier or more to 15 denier or less.

On the other hand, as described above, in the present invention, the low denier staple fibers refer to staple fibers having a fineness of 2 denier or more to less than 7 denier, and the high denier staple fibers refer to staple fibers having a fineness of 7 denier or more to 15 denier or less.

If the low denier staple fibers are less than 20 wt % and the high denier staple fibers are more than 80 wt %, the content of the high denier staple fibers is large so that the space between the staple fibers in the sheet is widened, and as a result, the water permeability and air permeability may be improved, but the anti-weed effect may be deteriorated. If the low denier staple fibers are more than 80 wt % and the high denier staple fibers are less than 20 wt %, the content of the low denier staple fibers is large so that the space between the staple fibers is dense in the sheet, and as a result, the anti-weed effect may be improved, but the water permeability and air permeability may be deteriorated.

The anti-weed sheet according to the present invention may be formed by forming a plurality of webs having a low weight.

If the staple fibers of a single web are bonded to each other by needle punching in a sheet having the same weight, uniformity of the staple fibers distributed on the single web may be lowered, and as a result, differences in physical properties may occur depending on positions in the same sheet. However, when a plurality of sheets having a low weight are formed and bonded to each other by needle punching, the binding force between the webs and between the staple fibers in the web is improved, and simultaneously, the uniformity of the staple fibers distributed on the web is improved, and thus performance of the sheet may be improved because there is no difference in physical property depending on the position in the same sheet.

The weight of the web used in the present invention may be 5 to 50 $g/m^2$, preferably 10 to 30 $g/m^2$. At this time, the number of webs to be formed to manufacture the sheet may be determined in consideration of the weight of the final sheet. For example, when the weight of the final sheet is 300 $g/m^2$, a web of 15 to 20 $g/m^2$ may be formed to 15 to 20 layers to form a multi-layered web.

If the weight of the web is less than 5 $g/m^2$, the uniformity of the staple fibers distributed on the web may be improved, but the manufacturing efficiency may be reduced, so that the manufacturing cost may be increased. If the weight of one web is more than 50 $g/m^2$, the manufacturing efficiency may be increased, but the uniformity of the staple fibers distributed on the web is decreased, so that the performance of the sheet may be reduced.

In addition, the web used in the present invention may be integrally bonded to the sheet so that the webs are alternately formed based on a length direction of the sheet.

If the multi-layered webs are alternately formed in different directions, the uniformity of the staple fibers on the web distributed in the sheet is increased as compared with a case where the webs are formed only in one direction, so that the lamination effect of the web is improved, thereby improving the properties such as tensile strength and elongation.

The anti-weed sheet according to the present invention may be formed by varying the speed of the needle punching when integrally bonding the formed webs.

That is, in the needle punching, the binding force of the formed webs may be improved by proceeding in the order of pre-needle punching, low-speed needle punching, high-speed needle punching and low-speed needle punching to integrally bond the multi-layered web. If the needle punching is performed at a low speed, bridging between the staple fibers is formed on the surface of the multi-layered web, but the bridging between the staple fibers does not occur therein. If the needle punching is performed only at a high speed, excessive force is applied to the surface to generate pores between the staple fibers instead of the bridging between the staple fibers, and the uniformity of the sheet is reduced so that a deviation in performance of the sheet occurs and simultaneously, the performance of the sheet is deteriorated. Therefore, if the punching speed of the needle is increased from a high speed to a low speed after applying the punching of the needle very weakly through the pre-needle, the staple fibers are uniformly bridged on not only the surface of the multi-layered web but also the inside thereof, so that the performance of the sheet is improved.

The anti-weed sheet according to the present invention may form the surface modified by the unevenness treatment by an uneven drum, a high frequency device, an ultrasonic device, or the like, and the heat treatment by a hot air device, a heating drum, or the like.

If the unevenness treatment is performed on the surface of the sheet to form unevenness, the surface area of the sheet is widened, so that the air in the atmosphere may easily penetrate into the soil through the sheet and the moisture may be easily absorbed from the surface of the sheet to have an excellent water permeability effect.

In addition, when the surface of the sheet is heat-treated, the heat-treated surface is instantaneously melted and solidified again to form a rough surface, so that the surface area of the sheet is widened similarly to the unevenness treatment, and as a result, the air in the atmosphere may easily penetrate into the soil through the sheet, the moisture is also easily absorbed from the surface of the widened sheet to have a good water permeability effect, and the tensile strength and the elongation may be improved due to the instantly melting and then solidification.

The anti-weed sheet according to an exemplary embodiment of the present invention may not only suppress the growth of weeds with high mechanical properties and a dense structure but also prevent acidification and desertification of the soil because storm water and air are smoothly circulated due to high water permeability.

For example, when the anti-weed sheet according to the exemplary embodiment of the present invention is installed on the upper or lower surface of the ground such as the soil where the crop is planted or the shoulder of roadside, the anti-weed sheet may suppress the growth of weeds and the acidification of the soil due to the selective permeability in which active components such as water, air and liquid fertilizers are permeated and seeds of the weeds and the like are not permeated and further prevent a loss of the soil and the like due to excellent tensile strength and elongation of the sheet.

Next, a method for manufacturing an anti-weed sheet according to an exemplary embodiment of the present invention will be described.

Figure 2:
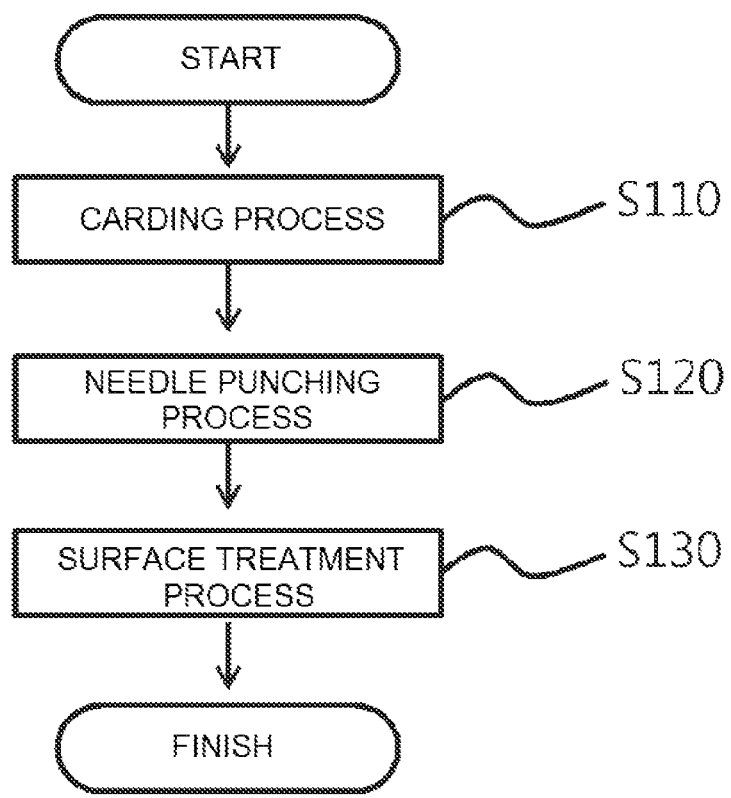
FIG. 2 is a process diagram of a method for manufacturing an anti-weed sheet according to an exemplary embodiment of the present invention.

FIG. 2 is a process diagram of a method for manufacturing an anti-weed sheet according to an exemplary embodiment of the present invention. As shown in FIG. 2, a method of manufacturing an anti-weed sheet according to an exemplary embodiment of the present invention includes a carding step (S110), a needle punching step (S120), and a surface treatment step (S130).

The carding step (S110) is a process of forming a web in which staple fibers are aligned in a horizontal direction of a plane direction of the sheet to be manufactured. In this process, the number and direction of the webs to be formed may be adjusted by using a cross lapper.

Meanwhile, although not shown, a fiber mixing process of uniformly mixing the staple fibers before the carding process (S110) may be preceded in order to uniformalize the staple fibers forming the web. According to the fiber mixing process, not only single staple fibers but also different types of staple fibers may be uniformly mixed to form a web having a constant thickness and fiber density.

Next, in the needle punching step (S120), staple fibers of the multi-layer web formed through the carding step (S110) are mechanically tangled with each other through the needle punching machine to form a sheet having a constant thickness and fiber density. At this time, the sheet may be manufactured by forming webs of fine weights formed in the carding step (S110) and bonding the webs by a needle punching machine, or by bonding webs having a weight summing the webs of the fine weights by a needle punching machine. Further, the binding force of the formed webs may be further improved by proceeding in the order of pre-needle punching, low-speed needle punching, high-speed needle punching and low-speed needle punching by adjusting the speed of the needle punching machine to integrally bond the multi-layered webs.

Figure 3:
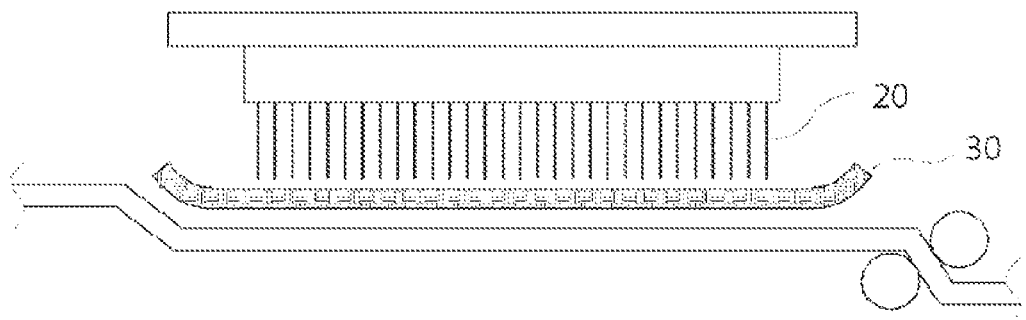
FIG. 3 is a needle punching process diagram of a method for manufacturing an anti-weed sheet according to an exemplary embodiment of the present invention.

FIG. 3 shows a needle punching process during the manufacturing process of the anti-weed sheet according to the present invention. When a carded web 30 passes through a needle punching machine, the staple fibers are mechanically tangled with each other to form a sheet having a constant thickness and fiber density by punching the surface or the back surface of the staple fibers by repeated up and down movements by a plurality of needles 20 in a vertical direction in the web 30.

Next, in the surface treatment step (S130), a surface modified by the unevenness treatment by an uneven drum, a high frequency device, an ultrasonic device, or the like, and the heat treatment by a hot air device, a heating drum, or the like may be formed on the web bonded in the needle punching process (S120), that is, the sheet.

The surface treatment by the unevenness treatment includes a method of passing a sheet through an uneven drum having a plurality of uneven structures on the outer circumferential surface, a method of passing a sheet through a high-frequency or ultrasonic device to form the unevenness, or the like. The surface treatment by heat treatment includes a method of passing a sheet through a hot air blower, a method of passing a sheet through a pair of heating drums in which at least one heating device is embedded, or the like. A set temperature of the hot air heater or the heating drum during the heat treatment is preferably 110 to 160° C., and the temperature may be adjusted within the range of the temperature depending on a type of polyolefin staple fibers used in the manufacturing of the sheet.

Hereinafter, the present invention will be described in more detail with reference to the following Examples, but the following Examples are just proposed in order to help in understanding of the present invention, and the present invention is not limited thereto.

Example 1

A web of 10 g/m$^2$ was formed using polypropylene staple fibers having a high denier fineness, and the webs were formed and needle-punched, and then the surface thereof was heat-treated with hot air at 145 to 155° C. to form an anti-weed sheet.

Example 2

A web of 10 g/m$^2$ was formed using polypropylene staple fibers having a high denier fineness, and the webs were formed and needle-punched, and then the surface thereof was heat-treated with a heating drum at 145 to 155° C. to form an anti-weed sheet.

Example 3

A web of 10 g/m$^2$ was formed by mixing 50 wt % of polypropylene staple fibers having a low denier fineness and 50 wt % of polypropylene staple fibers having a high denier fineness, and the webs were formed and needle-punched, and then the surface thereof was heat-treated with hot air at 145 to 155° C. to form an anti-weed sheet.

Example 4

A web of 10 g/m$^2$ was formed by mixing 50 wt % of polypropylene staple fibers having a low denier fineness and 50 wt % of polypropylene staple fibers having a high denier fineness, and the webs were formed and needle-punched, and then the surface thereof was heat-treated with a heating drum at 145 to 155° C. to form an anti-weed sheet.

Comparative Example 1

An anti-weed sheet was formed in the same manner as in Example 1 except that the surface was not heat-treated.

Table 1 below shows relative values for physical properties of the anti-weed sheets manufactured according to Examples 1 to 4 of the present invention with respect to the anti-weed sheet manufactured according to Comparative Example 1.

As shown in Table 1, in the sheets manufactured according to Examples 1 to 4 of the present invention, it can be seen that the elongation is reduced and the tensile strength is increased as compared with the sheet manufactured according to Comparative Example 1. Specifically, as compared with Comparative Example 1 in which the surface was not modified by the unevenness treatment or the heat treatment on the surface of the sheet, in Examples 1 to 4 of the present invention in which the surface of the sheet was heat-treated with hot air or a heating drum, the tensile strength was increased by 27.2 to 72.4% and the elongation was reduced by 9.1 to 22.3%. As a result, it can be seen that due to more stable tensile strength caused by the complementary action of the fiber structure due to the interactions between the fibers having different finenesses and the surface modification, an effective anti-weed sheet with improved durability may be used.

Hereinabove, the present invention has been exemplarily described and various modifications can be made by those skilled in the art within the scope without departing from essential characteristics of the present invention. Therefore, the exemplary embodiments of the present invention are provided for illustrative purposes only but not intended to limit the present invention. The concept and scope of the present invention are not limited to the exemplary embodiments. The protective scope of the present invention should be construed based on the following claims, and all the techniques in the equivalent scope thereof should be construed as falling within the scope of the present invention.

The invention claimed is:

1. A method for manufacturing an anti-weed sheet, comprising:
    forming webs with polyolefin-based staple fibers, wherein the polyolefin-based staple fibers comprise at least one selected from the group consisting of polyethylene staple fibers, polypropylene staple fibers, and polyisobutylene staple fibers;
    forming a multilayered sheet with the webs;
    integrally bonding the webs forming the multilayered sheet by needle punching, wherein the needle punching is performed in an order of pre-needle punching, low-speed needle punching, high-speed needle punching and low-speed needle punching to uniformly bridge a surface and an inside of the multilayered sheet formed by the webs and to improve a binding force; and
    modifying at least one surface of the multilayered sheet which is needle punched by heat treatment through hot air or a heating drum to form the anti-weed sheet.

2. The method of claim 1, wherein the webs are formed of staple fibers having a fineness of 2 denier to 15 denier.

3. The method of claim 1, wherein the webs are formed by mixing 20 to 80 wt % of low denier staple fibers having a fineness of 2 denier to 7 denier and 20 to 80 wt % of high denier staple fibers having 7 denier to 15 denier.

4. The method of claim 1, wherein a weight of a single web of the webs is 5 to 50 g/m$^2$.

5. The method of claim 1, wherein fibers of the webs of the multilayered sheet are in different directions so that the webs are integrally bonded to form the multilayered sheet.

* * * * *